(12) United States Patent
Chan et al.

(10) Patent No.: US 8,004,790 B2
(45) Date of Patent: Aug. 23, 2011

(54) SPOILER WITH INTEGRATED BYPASS CHANNEL WALL FOR HDD APPLICATIONS

(75) Inventors: Andre S. Chan, Milpitas, CA (US); Chisin Chiang, San Jose, CA (US); Ferdinand Hendriks, Morgan Hill, CA (US); James F. Sullivan, San Jose, CA (US)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 777 days.

(21) Appl. No.: 11/824,158

(22) Filed: Jun. 28, 2007

(65) Prior Publication Data
US 2009/0002890 A1 Jan. 1, 2009

(51) Int. Cl.
*G11B 33/14* (2006.01)
(52) U.S. Cl. .................................................. 360/97.02
(58) Field of Classification Search .................. None
See application file for complete search history.

(56) References Cited

U.S. PATENT DOCUMENTS

| | | | | |
|---|---|---|---|---|
| 5,898,545 A * | 4/1999 | Schirle | | 360/254.7 |
| 6,449,119 B1 * | 9/2002 | Hashizume et al. | | 360/97.03 |
| 6,542,328 B2 * | 4/2003 | Harrison et al. | | 360/97.03 |
| 6,560,065 B1 * | 5/2003 | Yang et al. | | 360/97.02 |
| 6,728,062 B1 * | 4/2004 | Ou-Yang et al. | | 360/97.02 |
| 6,930,857 B1 * | 8/2005 | Lin et al. | | 360/97.02 |
| 6,999,273 B2 * | 2/2006 | Tsang et al. | | |
| 7,002,773 B2 * | 2/2006 | Kang et al. | | |
| 7,006,324 B1 * | 2/2006 | Oveyssi et al. | | |
| 7,057,851 B2 * | 6/2006 | Sun et al. | | |
| 7,312,950 B2 * | 12/2007 | Voights et al. | | |
| 7,327,530 B2 * | 2/2008 | Lee et al. | | |
| 7,349,178 B2 * | 3/2008 | Tadepalli et al. | | |
| 7,379,265 B2 * | 5/2008 | Wang et al. | | |
| 7,420,775 B2 * | 9/2008 | Lim | | |
| 7,453,667 B2 * | 11/2008 | Cho et al. | | |
| 7,545,600 B2 * | 6/2009 | Sorrell et al. | | |
| 7,554,762 B2 * | 6/2009 | Suwa et al. | | |
| 7,616,402 B2 * | 11/2009 | Suwa et al. | | |
| 7,830,636 B2 * | 11/2010 | Ang et al. | | 360/97.02 |
| 2008/0112074 A1 * | 5/2008 | Yao et al. | | 360/97.02 |
| 2008/0158727 A1 * | 7/2008 | Ang et al. | | 360/97.02 |

* cited by examiner

*Primary Examiner* — Mark Blouin

(57) ABSTRACT

A spoiler implementable in a hard disk drive. The spoiler includes a structure. The structure includes a diffuser integrated therewith. The structure further includes an extension emanating therefrom, the extension configured to complete a wall of a bypass channel in said hard disk drive, said inner wall having a portion removed there from.

18 Claims, 8 Drawing Sheets

SPOILER WITH INTEGRATED BYPASS CHANNEL WALL FOR HDD APPLICATIONS

TECHNICAL FIELD

The invention relates to the field of hard disk drives.

BACKGROUND ART

Direct access storage devices (DASD) have become part of everyday life, and as such, expectations and demands continually increase for greater speed for manipulating and for holding larger amounts of data. To meet these demands for increased performance, the mechano-electrical assembly in a DASD device, specifically the Hard Disk Drive (HDD) has evolved to meet these demands.

Advances in magnetic recording heads as well as the disk media have allowed more data to be stored on a disk's recording surface. The ability of an HDD to access this data quickly is largely a function of the performance of the mechanical components of the HDD. Once this data is accessed, the ability of an HDD to read and write this data quickly is primarily a function of the electrical components of the HDD.

A computer storage system may include a magnetic hard disk(s) or drive(s) within an outer housing or base containing a spindle motor assembly having a central drive hub that rotates the disk. An actuator includes a plurality of parallel actuator arms in the form of a comb that is movably or pivotally mounted to the base about a pivot assembly. A controller is also mounted to the base for selectively moving the comb of arms relative to the disk.

Each actuator arm has extending from it at least one cantilevered electrical lead suspension. A magnetic read/write transducer or head is mounted on a slider and secured to a flexure that is flexibly mounted to each suspension. The read/write heads magnetically read data from and/or magnetically write data to the disk. The level of integration called the head gimbal assembly (HGA) is the head and the slider, which are mounted on the suspension. The slider is usually bonded to the end of the suspension.

A suspension has a spring-like quality, which biases or presses the air-bearing surface of the slider against the disk to cause the slider to fly at a precise distance from the disk. Movement of the actuator by the controller causes the head gimbal assemblies to move along radial arcs across tracks on the disk until the heads settle on their set target tracks. The head gimbal assemblies operate in and move in unison with one another or use multiple independent actuators wherein the arms can move independently of one another.

To allow more data to be stored on the surface of the disk, more data tracks must be stored more closely together. The quantity of data tracks recorded on the surface of the disk is determined partly by how well the read/write head on the slider can be positioned and made stable over a desired data track. During read/write operations, there is present within the HDD an internally generated air turbulence that is caused by the rotation of the disk(s). Hard Disk Drives with faster disk rotational speeds are subject to increased air turbulence. The generated air turbulence can cause instability in the read/write head during read/write operations.

With reference to FIG. 5, to control some of the generated air flow, e.g., air flow 14 in a hard disk drive, e.g., drive 99, an air flow bypass channel has been implemented within the structure of housing 13 of HDD 99, e.g., bypass channel 55. Air flow bypass channel 55 is able to capture air flow 14, centrifugally directed outward and which is generated by disk(s) 15 during operation, and recirculate, or channel, air flow 14 so as to control the direction of some of the generated air turbulence.

There is also an air flow, e.g., air flow 18, generated by disk(s) 15 and directed toward the suspension and the read/write, generally indicated by dotted line 27, and which is not captured by air flow bypass channel 14. To that extent, a spoiler component, e.g., spoiler component 90, has been developed to further diffuse and/or redirect a generated air flow away from the suspension and read/write head. To incorporate a spoiler 90 into a hard disk drive 13, a portion of inner wall 51 of air flow bypass channel 55 is removed from and/or omitted during the fabrication thereof, generally indicated by dotted line 40, allowing installation of spoiler 90. The removed/omitted portion 40 of inner wall 51 and spoiler 90 are observed not to provide a complete inner wall 51, thus allowing air flow 14 to escape from bypass channel 55, as indicated by arrow 50.

SUMMARY OF THE INVENTION

A spoiler having an integrated wall feature implementable in a hard disk drive. The spoiler includes a structure having a diffuser integrated therewith. The structure further includes an extension emanating there from, the extension configured to complete a wall of a bypass channel in said hard disk drive.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to embodiment(s) of the present invention. While the invention will be described in conjunction with the embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

The discussion will begin with an overview of a hard disk drive and components connected within. The discussion will then focus on embodiments of the invention that provide a spoiler with an integrated bypass channel wall for utilization in HDDs.

Although embodiments of the present invention will be described in conjunction with a slider integrated in a microactuator, it is understood that the embodiments described herein are useful outside of the art of microactuators, such as devices requiring high frequency transmission between two devices that have relative motion. The integration of the slider and a microactuator is one example of embodiments of the present invention and is provided herein merely for purposes of brevity and clarity.

Overview

Figure 1:
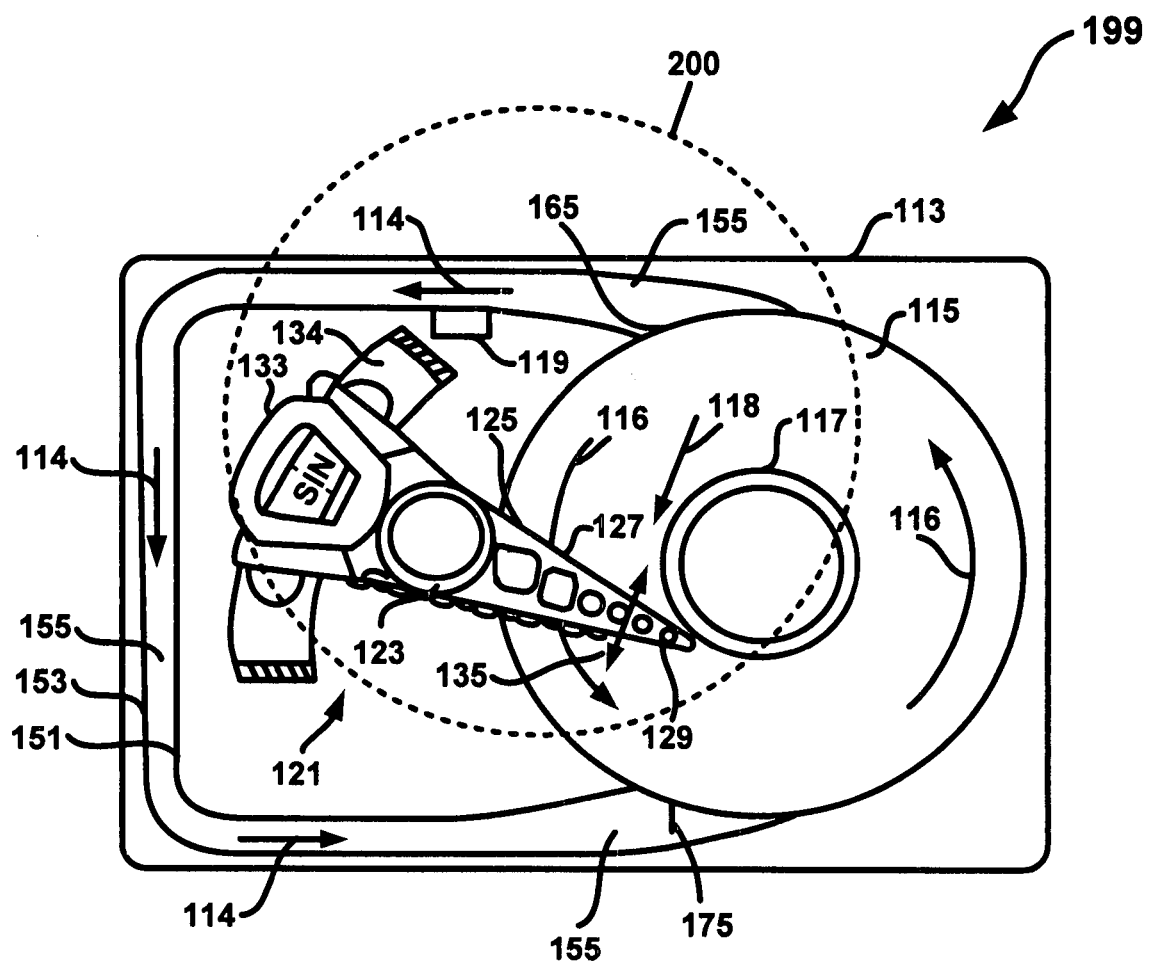
FIG. 1 is plan view of a hard disk drive (HDD) upon which embodiments of the present invention may be practiced.

With reference now to FIG. 1, a schematic drawing of an embodiment of an information storage system comprising a magnetic hard disk file or drive 199 for a computer system is shown. Drive 199 has an outer housing or base 113 containing a disk pack having at least one media or magnetic disk 115. Although not shown in FIG. 1, it is noted that there is an appropriately configured (mated) cover for disposition upon outer housing 113, such that when the cover is in place, a sealed HDD exists. A spindle motor assembly having a central drive hub 117 rotates the disk or disks 115, as indicated by arrows 116. During HDD operation, the rotation of disks 115, as indicated by arrows 116, generates an air flow, e.g., air flow 118, directed toward an actuator 121, and air flow 156 directed toward an air bypass channel 155. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered electrical lead suspension (ELS) 127 The ELS may be any form of lead suspension that can be used in a Data Access Storage Device, such as a HDD. A magnetic read/write transducer or head is mounted on a slider 129 and secured to a flexure that is flexibly mounted to each ELS 127. The read/write heads magnetically read data from and/or magnetically write data to disk 115. The level of integration called the head gimbal assembly is the head and the slider 129, which are mounted on suspension (also referred to as a flexure) 127. The slider 129 is usually bonded to the end of ELS 127.

ELS 127 has a spring-like quality, which biases or presses the air-bearing surface of the slider 129 against the disk 115 to cause the slider 129 to fly at a precise distance from the disk. ELS 127 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies. Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and move in unison with one another, unless drive 199 uses multiple independent actuators (not shown) wherein the arms can move independently of one another.

Air flows 114 and 118 can cause instability of slider 129 during HDD operation. To mitigate air flow 114, a bypass channel 155, being disposed within housing 113, is configured to redirect generated air flow 156 away from ELS 127 during HDD operations. Bypass channel 155 includes an intake portion 145, an exhaust portion 165, an inner wall structure 151 and an outer wall structure 153.

It is noted that generated air flow 118, due to rotation 116 of disk 115 during HDD operation, is directed toward slider 129 during HDD operation.

Also included in FIG. 1 is a region 200 which includes the interface of disks 115 and intake potion 145 of bypass channel 155. It is with particular attention to region 200 that embodiments of the present invention are drawn.

Figure 2A:
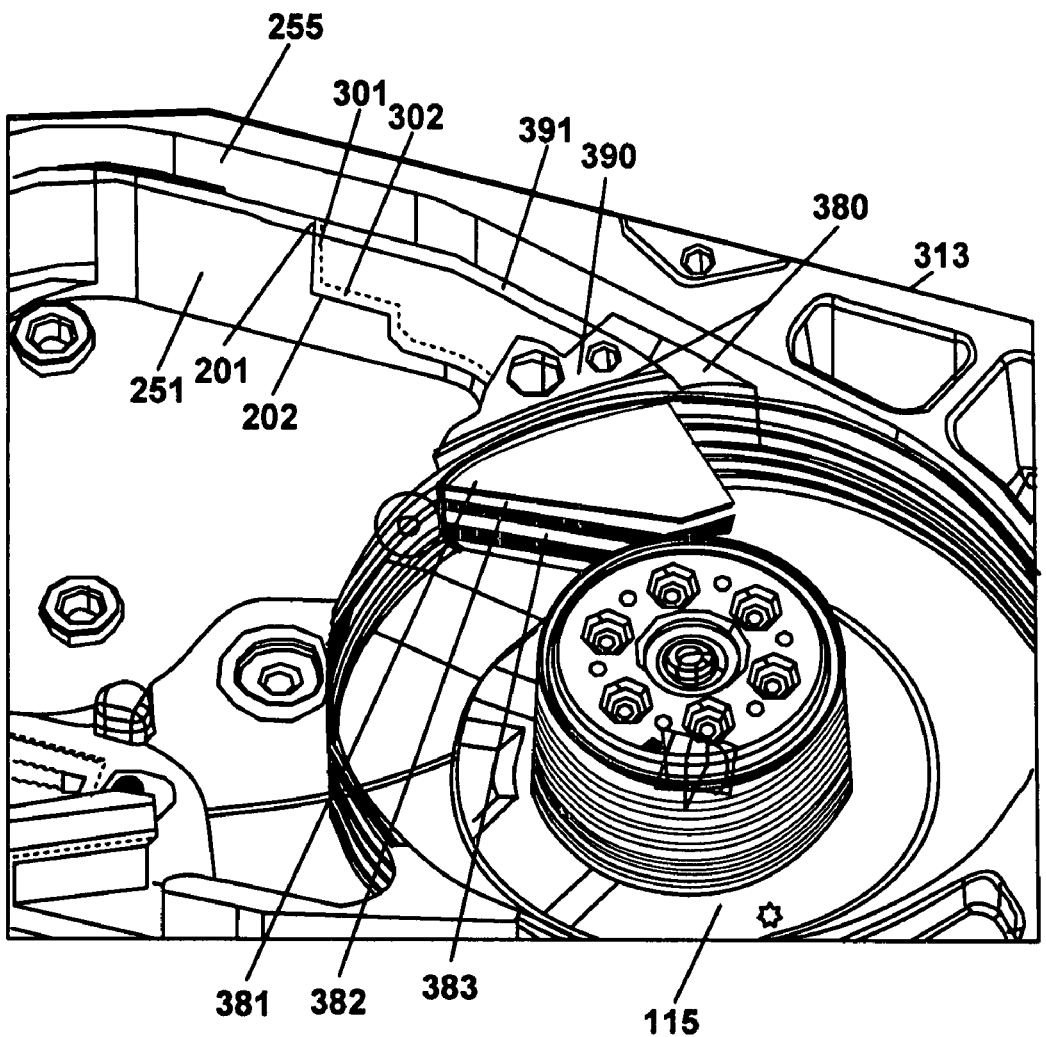
FIG. 2A is an illustrated view of a spoiler assembly and a mated inner wall of the air bypass channel of the HDD of FIG. 1, in accordance with an embodiment of the present invention.

FIG. 2A is an expanded view of region 200 from FIG. 1 in an embodiment of the present invention. Region 200 includes a spoiler, e.g., spoiler 390, for diffusing and/or redirecting air turbulence 118 away from slider 129. Spoiler 390, mounted upon and within hard disk drive 299, is shown to include a diffuser portion 380 including three diffusing fin sections 381, 382 and 383, in which fins 381, 382 and 383 are interposed between four hard disks 115. In alternative embodiments, and dependent upon the number of disks 115 present in an HDD, spoiler 380 may have a fewer number or a greater number of fins. Further, in other alternative embodiments, the plurality of fins may be configured such that a fin is present above the top most disk 115, interposed between other disks 115, and also present below the bottom most disk 115. Thus, in the shown example, there would be five fins for the four disks 115. In yet another embodiment, the number of fins may be equal to the number of disks 115, such that the upper most disk 115 does not have a fin disposed there above or, alternatively, the bottom most disk 115 does not have a fin disposed there below.

In an embodiment, fins 381, 382 and 383 may be of any shape and size, given functional characteristics and constraints of the HDD into which spoiler 390 is to be implemented. As such, fins 381, 382 and 383 may be angular, rectangular, elliptical, oblong, rounded, or a combination thereof, or other shape that can provide diffusion and/or redirection of air turbulence, e.g., air turbulence 118, away from slider 129.

Also in FIG. 2A, spoiler 390 is also shown to include a tail portion 391 having a vertical contour 301 that is integrated therewithin and extends distally from diffuser portion 380 of spoiler 390, in an embodiment of the present invention. In the present embodiment, tail portion 391 is shown extending in the direction of vertical contour 201 of inner wall 251 of bypass channel 255. Tail portion 391 further includes a horizontal contour 302 that is oriented toward and mated with horizontal contour 202 of inner wall 251 of bypass channel 255.

A portion of inner wall 251 of bypass channel 255 has been contoured and/or had a portion omitted there from during fabrication, leaving a remaining vertical surface, e.g., vertical surface 201, and a horizontal surface, e.g., horizontal surface 202 (relative to vertical surface 201), to facilitate installation of spoiler 390, in accordance with an embodiment of the present invention.

Contours 301 and 302 of tail portion 391 of spoiler 390 are appropriately contoured to mate with contours 201 and 202 of inner wall 251, or vice versa, such that when installed in HDD 213, spoiler 390 completes inner wall 251 of bypass channel 255. When installed, tail portion 391 provides a completed inner wall 251 for preventing air flow 114 from escaping bypass channel 255, in accordance with an embodiment of the present invention.

Figure 2B:
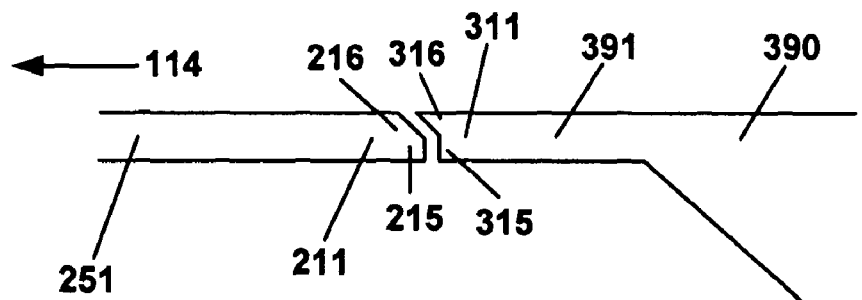
FIG. 2B is a top view of the spoiler assembly of FIG. 2A and a mated inner wall of the air bypass channel of FIG. 2A, in accordance with an embodiment of the present invention.

FIG. 2B is a top down block diagram of a contour that is implementable in inner wall 255 and tail portion 391 of a spoiler 390 of FIG. 2A, in accordance with an embodiment of the present invention. Vertical surface 211 of inner wall 251 shows a compound contour, facet 215 and facet 216, such that facet 216 is a beveled edge portion of facet 215. Tail portion 391 of spoiler 390 is shown to include a facet 315 and a facet 316 such that facets 215 and 315 and facets 216 and 316 are associatively mated.

Figure 2C:
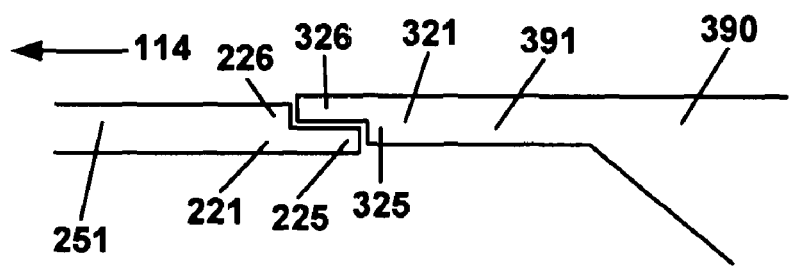
FIG. 2C is a top view of another spoiler assembly of FIG. 2A and a mated inner wall of the air bypass channel of FIG. 2A, in accordance with an embodiment of the present invention.

FIG. 2C is a top down block diagram of another contour that is implementable in inner wall 255 and tail portion 391 of spoiler 380 of FIG. 2A, in accordance with an embodiment of the present invention. Vertical surface 221 of inner wall 251 shows a compound square step contour, square step 225 and square step 226, such that square step 226 is parallel with and offset from square step 225. Tail portion 391 of spoiler 390 is shown to include a compound square step contour 321 having a square step 225 and a square step 326 such that square steps 225 and 325 and square steps 226 and 326 are associatively mated.

Figure 2D:
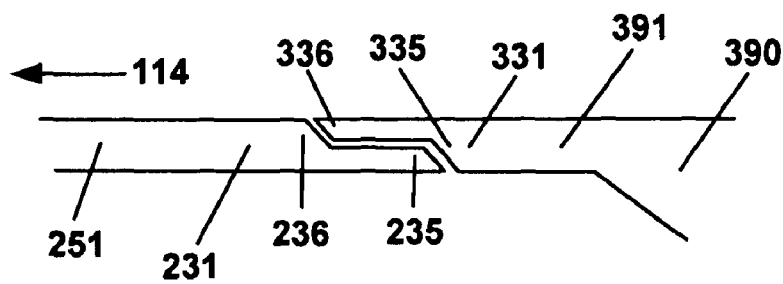
FIG. 2D is a top view of still another spoiler assembly of FIG. 2A and a mated inner wall of the air bypass channel of FIG. 2A, in accordance with an embodiment of the present invention.

FIG. 2D is a top down block diagram of still another contour that is implementable in inner wall 255 and tail portion 391 of spoiler 390 of FIG. 2A, in accordance with an embodiment of the present invention. Vertical surface 231 of inner wall 251 shows a compound offset angled step contour having an angled step 235 and an angled step 236, offset from step 235, and wherein both step 235 and step 236 are beveled in parallel. Tail portion 391 of spoiler 390 is shown to include a compound offset angle step contour 331 having an angled step 335 and an angled step 336, offset from step 335, such that steps 235 and 335 and steps 236 and 336 are associatively mated.

Figure 2E:
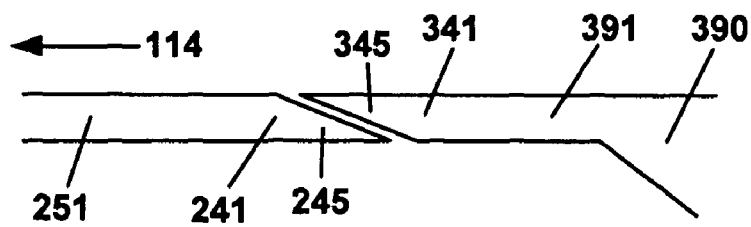
FIG. 2E is a top view of yet another spoiler assembly of FIG. 2A and a mated inner wall of the air bypass channel of FIG. 2A, in accordance with an embodiment of the present invention.

FIG. 2E is a top down block diagram of yet another contour that is implementable in inner wall 255 and tail portion 391 of spoiler 390, in accordance with an embodiment of the present invention. Vertical surface 241 of inner wall 251 shows a singularly beveled contour, e.g., bevel 245. Tail portion 391 of spoiler 390 is shown to include a vertical surface 341 having a singularly beveled contour, e.g., bevel 345, such that bevel 245 and bevel 345 are mated.

With collective reference to FIGS. 2B-2E, it is noted that alternative embodiments of the present invention may comprise contours including, but which are not limited to, rounded, elliptical, angled and squared surfaces, and combinations thereof which may be implemented as a vertical surface and/or horizontal surface of inner wall 251 and/or tail portion 391 of spoiler 390, in accordance with embodiments of the present invention.

Still referring to FIGS. 2A-2E, it is further noted that the contours applied to the vertical surface of inner wall 251, e.g., contours 211, 221, 231, 241 of FIGS. 2B-2E respectively, as well as being applied to the vertical surface 311, 321, 331, 341 of tail portion 391 of spoiler 390 are of some of the implementable contours, and as such should not to be construed as a limitation, but rather as examples of possible contours. Further, those contours may be singularly or combinationally implemented upon the vertical surfaces and/or the horizontal surface 202 of inner wall 251 as well as the mated horizontal surface of tail portion 391, e.g., horizontal surface 302, in accordance with an embodiment of the present invention.

Although contours 201 and 202 of FIG. 2A and contours 211/311, 221/321, 231/331 and 241/341 of FIGS. 2B-2E, respectively, are shown within a single general locale on inner wall 251, it is noted that the contours shown herein applied to inner wall 251 and spoiler 390 may be alternatively disposed anywhere along inner wall 251, and at any elevation of inner wall 251, with the caveat that inner wall 251 is complete, subsequent to installation of spoiler 390, in accordance with embodiments of the present invention.

Additionally, in the embodiments shown in FIGS. 2A-2E, spoiler 390 is installable in HDD 213 by initially placing tail portion 391 within bypass channel 255 and inwardly moving spoiler 390 toward disks 115 and inner wall 251 to complete an inner wall 251. In alternative embodiments, spoiler 390 may be installable in HDD 213 by initially placing tail portion 391 inward of inner wall 251 and moving outwardly toward inner wall 251 and toward disks 115. Accordingly, in this embodiment, contours of inner wall 251 and tail portion 391 of spoiler 390 are reversely configured.

Figure 3A:
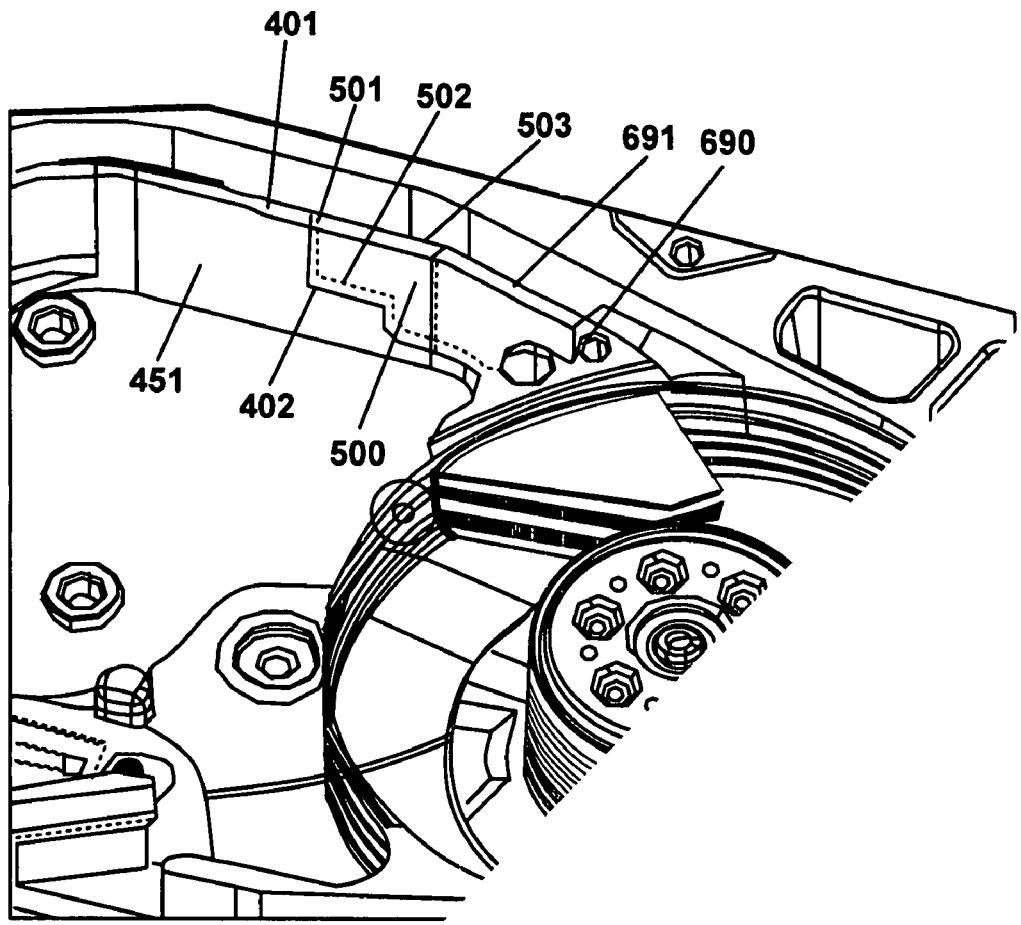
FIG. 3A is a plan view of a spoiler assembly, an inner wall completer component and a mated inner wall surface of the air bypass channel of a HDD, in accordance with an embodiment of the present invention.

FIG. 3A is another expanded view of region 200 of FIG. 1 in accordance with an embodiment of the present invention. Region 200 includes a spoiler 690, mounted upon and within hard disk drive 613, for diffusing and/or redirecting air turbulence 118 away from slider 129, and having a tail portion 691. Region 200 further includes a completer component 500 for providing a complete inner wall of a bypass channel 455 in accordance with an embodiment of the present invention. Region 200 further includes a bypass channel 455 including an inner wall 451 having a vertical surface 401 and a horizontal surface 402, similar to bypass channel 255 of FIG. 2A. Spoiler 690 is functionally similar to spoiler 390 of FIGS. 2A-2E with the following alteration.

Tail portion 691 of spoiler 690 is integrated therewithin and which extends distally from diffuser 680 of spoiler 690, in an embodiment of the present invention. In the present embodiment, tail portion 691 is shown to include a vertical portion 603 oriented in the direction of vertical surface 503 of completer component 500.

Completer component 500 is shown to include a vertical surface 501 oriented toward vertical surface 401 of inner wall 451 of bypass channel 455. Completer component 500 is also shown to include a second vertical surface 503 that is oriented toward vertical surface 603 of tail portion 691. Completer component further includes a horizontal surface 502 oriented toward horizontal surface 402 of inner wall 451. Implementation of completer component 500 and spoiler 690 complete bypass channel 455, thus preventing air flow 114 from escaping from channel 455, in accordance with an embodiment of the present invention.

Figure 3B:
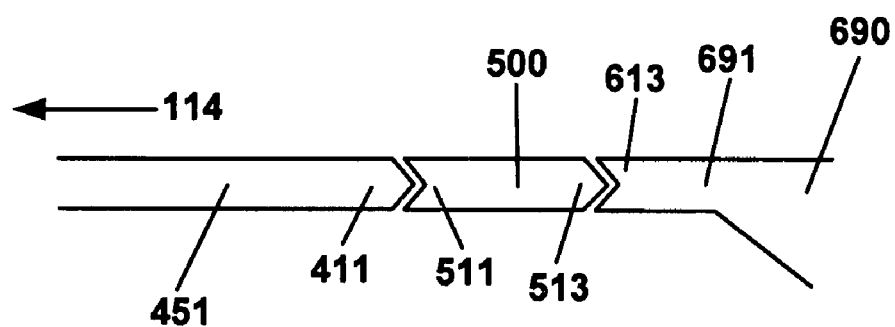
FIG. 3B is a top view of a vertical contour of the tail portion of the spoiler assembly of FIG. 3A, the inner wall of the air bypass channel of FIG. 3A, and an inner wall completer component, in accordance with an embodiment of the present invention.

FIG. 3B is a top down block diagram of contours that are implementable in inner wall 451, completer component 500, and spoiler 690 of FIG. 3A, in accordance with an embodiment of the present invention. Vertical surface 401 of inner wall 451 is shown to have extending outward there from a contoured tongue 411, in which tongue 411 is a "v" contour Completer component 500 is shown to include vertical surface 501 having a contoured groove 511 indented there in, and in which groove 511 includes a mated "v" contour of tongue 411, in an embodiment of the present invention. Groove 511 is oriented toward tongue 411. Completer component 500 is shown to also include a vertical surface 503 having a contoured tongue 513 having a "v" contour extending outward there from. Tongue 513 is oriented toward vertical surface 603 of tail portion 691 of spoiler 690.

Vertical surface 603 of spoiler 690 is shown to include a contoured groove 613 having a mated "v" contour of tongue 513 of completer component 500, in an embodiment of the present invention. Groove 613 is oriented toward and mated with tongue 513 of completer component 500.

Figure 3C:
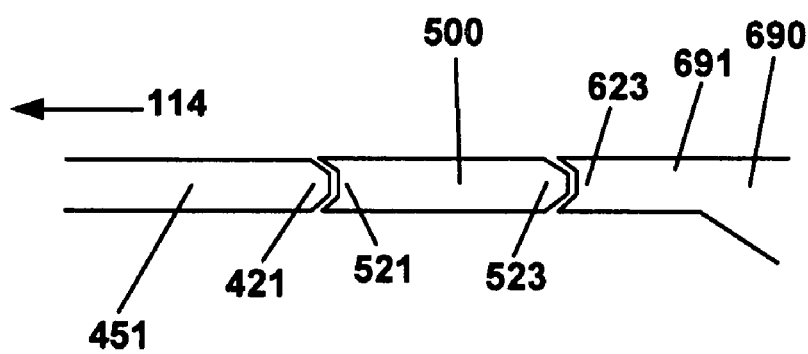
FIG. 3C is a top view of another vertical contour of the tail portion of the spoiler assembly of FIG. 3A, the inner wall of the air bypass channel of FIG. 3A, and an inner wall completer component, in accordance with an embodiment of the present invention.

FIG. 3C is a top down block diagram of contours that are implementable in inner wall 451, completer component 500, and spoiler 690 of FIG. 3A, in accordance with another embodiment of the present invention. Vertical surface 401 of inner wall 451 is shown to include a contoured tongue 421 extending there from and in which tongue 411 has a combination flat/bevel shape. Tongue 421 is oriented toward vertical surface 501 of completer component 500.

Completer component 500 is shown to include vertical surface 501 having a contoured groove 521 having a contour mated with tongue 421 of inner wall 451. Groove 521 is oriented toward tongue 421. Completer component 500 is also shown to have a vertical surface 503 having a contoured tongue 523 and in which tongue 523 is a similar to tongue 421. Tongue 523 is oriented toward groove 623 of tail portion 691 of spoiler 690.

Vertical surface 603 of spoiler 690 is shown as a contoured groove 623 having a contour mated to the contour of tongue 523 of completer component and in which groove 623 is oriented toward surface 523 of completer component 500.

Figure 3D:
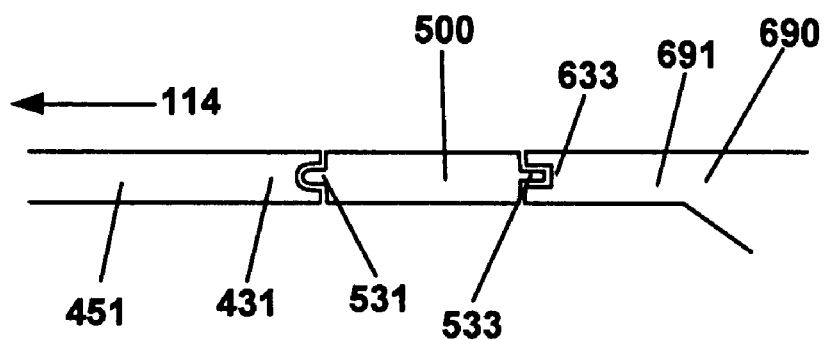
FIG. 3D is a top view of yet another vertical contour of the tail portion of the spoiler assembly of FIG. 3A, the inner wall of the air bypass channel of FIG. 3A, and an inner wall completer component, in accordance with an embodiment of the present invention.

FIG. 3D is a top down block diagram of contours that are implementable in inner wall 451, completer component 500, and spoiler 690 of FIG. 3A, in accordance with yet another embodiment of the present invention. Vertical surface 401 of inner wall 451 is shown to include a contoured groove 431 indented therein and in which groove 431 has a rounded shape. Groove 431 is oriented toward vertical surface 501 of completer component 500.

Completer component 500 is shown to include vertical surface 501 having a contoured tongue 531 extending there from and having a rounded contour mated with tongue 431 of inner wall 451. Tongue 531 is oriented toward groove 431. Completer component 500 is also shown to have a vertical surface 503 having a contoured tongue 533 and in which tongue 533 is rectangular in shape. Tongue 533 is oriented toward groove 633 of tail portion 691 of spoiler 690.

Vertical surface 603 of spoiler 690 is shown as having a contoured groove 633 in which groove 633 has a rectangular shape that is mated to tongue 533 of completer component 500. Groove 633 is oriented toward surface 503 of completer component 500.

Figure 3E:
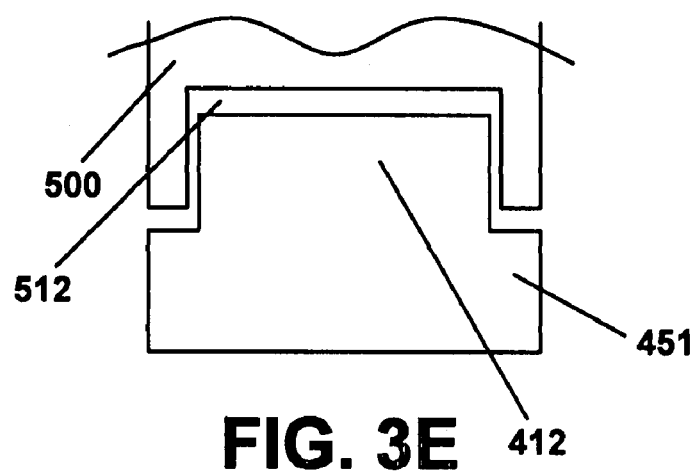
FIG. 3E is a profile view of a bottom contour of an inner wall completer component and the inner wall of the air bypass channel of FIG. 3A, in accordance with an embodiment of the present invention.

FIG. 3E is a profile view of contours that can be implemented as the horizontal surface 502 of completer component 500 and the horizontal surface 402 of inner wall 451 of bypass channel 455 in accordance with an embodiment of the present invention.

Horizontal surface 502 of completer component 500 is shown as having a contoured groove 512 indenting therein. Groove 512 is rectangular in shape and is mated to tongue 412 of inner wall 451. Horizontal surface 402 of inner wall 451 is shown to include a contoured tongue 412 having a rectangular shape and in which tongue 412 is mated to groove 512 of completer component and is oriented there toward.

Figure 3F:
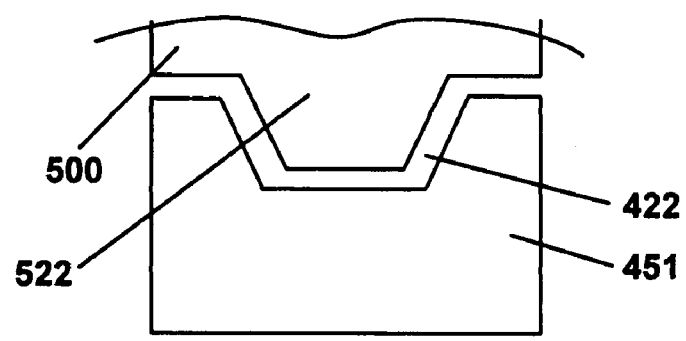
FIG. 3F is a profile view of another bottom contour of an inner wall completer component and the inner wall of the air bypass channel of FIG. 3A, in accordance with an embodiment of the present invention.

FIG. 3F is a profile view of contours that can be implemented as the horizontal surface 502 of completer component 500 and the horizontal surface 402 of inner wall 451 of bypass channel 455 of FIG. 3A, in accordance with an embodiment of the present invention.

Horizontal surface 502 of completer component 500 is shown as having a contoured tongue 522 extending there from in which tongue 522 has a compound flat/bevel shape. Horizontal surface 402 of inner wall 451 is shown to include a contoured groove 422 indenting therein and having a compound flat/bevel shape mated to the shape of tongue 522 of completer component 500 and is oriented there toward.

Figure 3G:
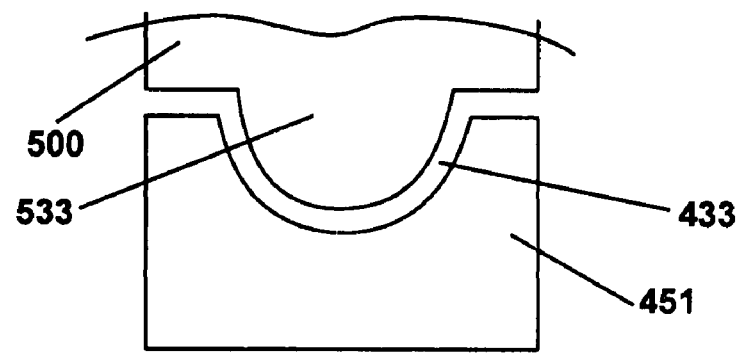
FIG. 3G is a profile view of yet another bottom horizontal contour of an inner wall completer component and the inner wall of the air bypass channel of FIG. 3A, in accordance with an embodiment of the present invention.

FIG. 3G is a profile view of contours that can be implemented as the horizontal surface 502 of completer component 500 and the horizontal surface 402 of inner wall 451 of bypass channel 455 of FIG. 3A, in accordance with yet another embodiment of the present invention.

Horizontal surface 502 of completer component 500 is shown as having a contoured tongue 532 extending there from in which tongue 532 has a rounded shape. Horizontal surface 402 of inner wall 451 is shown to include a contoured groove 432 indenting therein and having a rounded shape mated to the rounded shape of tongue 522 of completer component 500 and is oriented there toward.

Still referring to FIGS. 3A-3G, it is noted that the contours applied to vertical surface 401 of inner wall 451, e.g., contours 411, 421, 431 and 441, vertical surface 501 of completer component 500, e.g., contours 511, 521, 531, and 541, vertical surface 503 of completer component 500, e.g., contours 513, 523, 533 and 543, vertical surface 603 of tail portion 691 of spoiler 690, e.g., contours 613, 623, 633, 643, as well as contours applied to horizontal surface 502 of completer component 500, e.g., contours 512, 513 and 514, and contours applied to horizontal surface 402 of inner wall 451, e.g., contours 412, 422 and 432 are but some of the implementable contours, and as such the contours shown should not to be construed as a limitation, but rather as examples of possible contours. Further, those contours may be singularly and/or combinationally implemented upon or omitted from the vertical surfaces and/or the horizontal surfaces of inner wall 451, completer component 500 and spoiler 690, in accordance with an embodiment of the present invention.

Although the contours shown in FIGS. 3A-3G are shown located within a single general locale on inner wall 451, it is noted that the contours may be alternatively disposed anywhere along inner wall 451 and at any elevation of inner wall 451, with the caveat that inner wall 4 is complete, subsequent to installation of spoiler 690 and completer component 500, in accordance with embodiments of the present invention.

It is noted that upon installation of spoiler 690, as described in FIG. 2A, and installation of completer component 500, in a downward motion into the area between inner wall 451 and spoiler 690, a complete inner wall 451 is provided. It is further noted that the contours implemented, with reference to FIGS. 3A-3G, are configured to provide passive retention upon completer component 500 for preventing movement of completer component 500 once installed.

Figure 4:
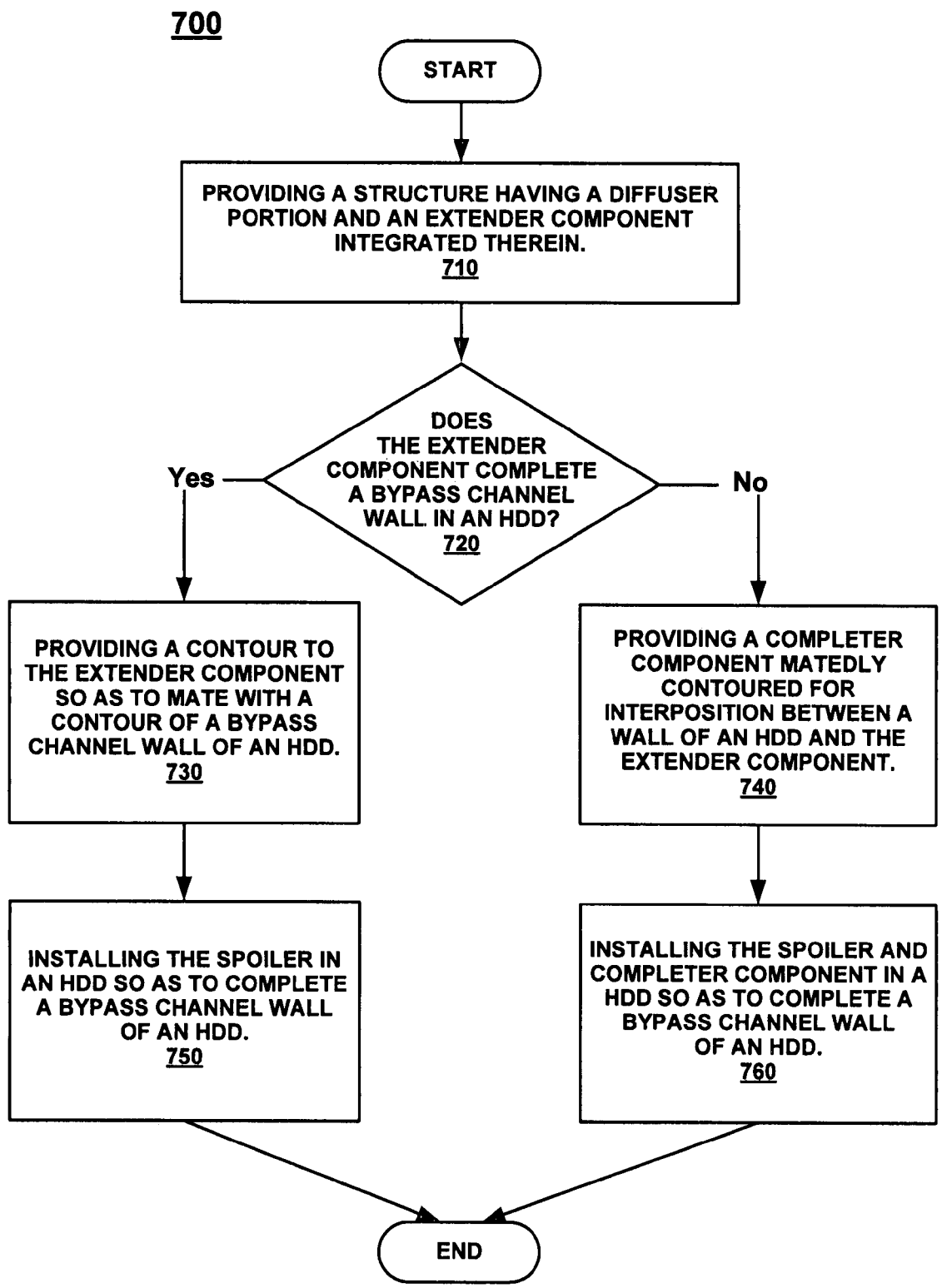
FIG. 4 is a flowchart of a method for a spoiler assembly in accordance with an embodiment of the present invention.
Figure 5:
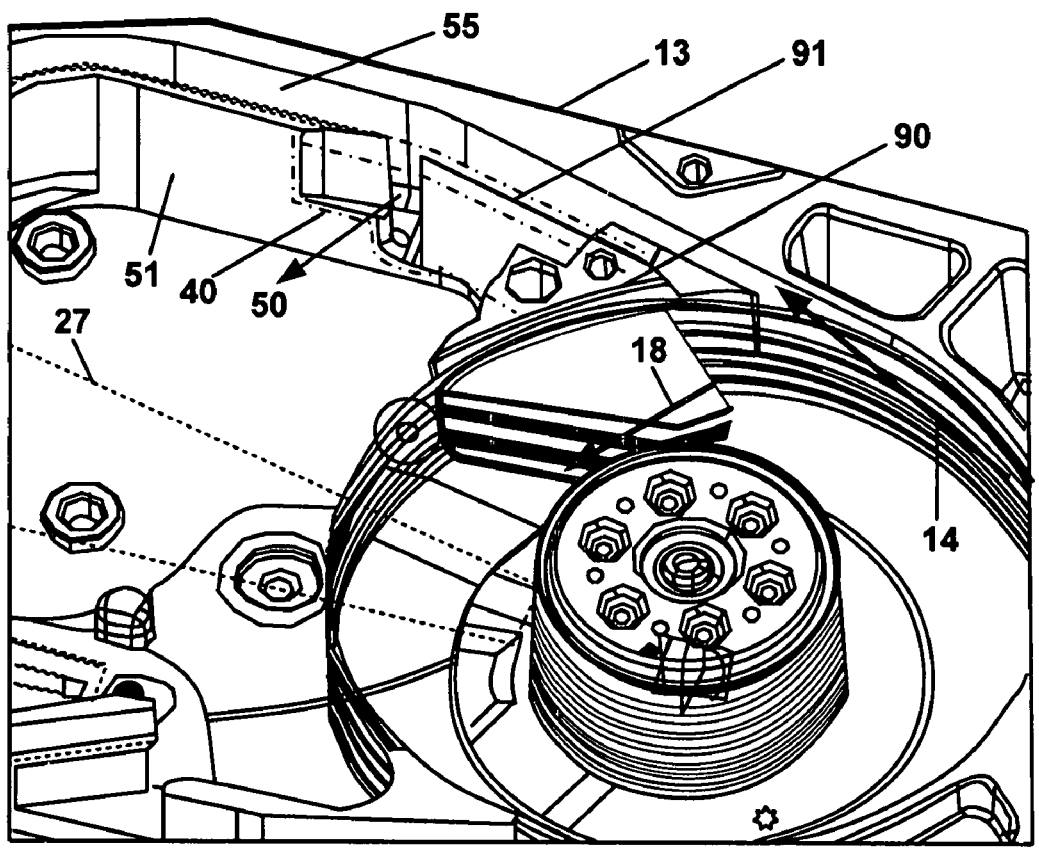
FIG. 5 is an example of an existing spoiler in a hard disk drive.

FIG. 4 is a flowchart of a process 700 for a spoiler having an integrated extender for completing an inner wall of a bypass channel in an HDD, in accordance with an embodiment of the present invention. FIG. 4 is a flow chart of a process 700 in which particular steps are performed in accordance with an embodiment of the present invention for fabricating a lapping texture element. Although specific steps are disclosed in process 700, such steps are exemplary. That is, the present invention is well suited to performing various other steps or variations of the steps recited in FIG. 4. Within the present embodiment, it should be appreciated that the steps of process 700 may be performed by software, by hardware, by an assembly mechanism, through human interaction, or by any combination of software, hardware, assembly mechanism, and human interaction.

Process 700 will be described with reference to components and devices shown in FIGS. 2A-2E and FIGS. 3A-3G.

In step 710 of process 700 for a spoiler with an integrated inner wall structure, a spoiler, e.g., spoiler 390 or 690 is provided and includes a tail portion, e.g., tail portion 391 or 691, in an embodiment of the present invention. Spoiler 390 or 690 further includes a diffuser region, e.g., diffuser 380 or 680.

In step 720 of process 700, it is determined if spoiler 390 can complete an inner wall of a bypass channel, e.g., inner wall 251 of bypass channel 255 of FIG. 2A, in an embodiment of the present invention. If spoiler 390 can complete an inner wall, process 700 proceeds to step 730. If spoiler 390 is unable to complete an inner wall, process 700 proceeds to step 740.

In step 730 of process 700, tail portion 391 of spoiler 390 is contoured to be mated to a contour present on inner wall 251 of bypass channel 255, e.g., contours (215/315, 216/316), (225/325, 226/326), (235/335, 236/336) and (245/345) as shown and described herein with reference to FIGS. 2B-2E, respectively.

In step 750 of process 700, spoiler 390 is installed into a hard disk drive, e.g., hard disk drive 300 of FIGS. 2A-2E, in accordance with an embodiment of the present invention.

In step 740 of process 700, if a spoiler 390 is unable to complete an inner wall of a bypass channel, e.g., inner wall 451 of bypass channel 455 of FIGS. 3A-3G, a completer component, e.g., completer component 500 is provided. Completer component 500 completes an inner wall 451 of bypass channel 455 when installed with a spoiler 690, as described herein with reference to FIGS. 3A-3G.

In step 760 of process 700, a spoiler 690 is installed as described herein with reference to FIGS. 2A and 3A-3G. A completer component 500 is then installed between spoiler 690 and inner wall 451 of bypass channel 455, thus providing a complete inner wall 451 of bypass channel 455, in accordance with an embodiment of the present invention.

Embodiments of the present invention, in the various presented embodiments, provide a spoiler with an integrated inner wall of a bypass channel implementable in a hard disk drive.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A spoiler implementable in a hard disk drive and comprising:
   a structure;
   a diffuser integrated with said structure;
   an extension emanating from said structure, said extension configured to complete a wall of a bypass channel in said hard disk drive, said inner wall having a portion removed there from; and
   a completer component, said completer component configured for interposition between said wall and said extension.

2. The spoiler as recited in claim 1 wherein said extension further comprises a extension contour.

3. The spoiler as recited in claim 2 wherein said extension contour is mated to a wall contour of said wall of said bypass channel of said hard disk drive.

4. The spoiler as recited in claim 1 wherein said completer component further comprises a contour mated to said wall contour of said inner wall and another contour mated to said extension contour.

5. The spoiler as recited in claim 4 wherein said wall contour and said extension contour are an extrusion and wherein said contour and said another contour of said completer component are an indentation into which said extrusion is disposed.

6. The spoiler as recited in claim 4 wherein said wall contour and said extension contour are an indentation and wherein said contour and said another contour of said completer component are an extrusion disposable in said indentation.

7. The spoiler as recited in claim 4 wherein said completer component further comprises an extruded portion and an indented portion, said extruded portion configured for disposition proximal to an indented surface and said indented portion configured for disposition proximal to an extruded surface.

8. A hard disk comprising:
   a housing;
   a disk pack mounted to the housing and having a, at least one, disk that is/are rotatable relative to the housing, said disk pack defining an axis of rotation and a radial direction relative to the axis, said disk pack having a downstream side wherein air flows away from the disk, and an upstream side wherein air flows toward the disk;
   an actuator mounted to the housing and being movable relative to said disk pack, the actuator having one or more heads for reading data from and writing data to said disks;
   an air flow bypass channel integrated in said housing, said bypass channel having an inner wall and an outer wall; and a spoiler for diffusing air flow generated during rotation of said disk pack, said air flow directed toward said actuator, said spoiler comprising;

a structure;

a diffuser integrated in said structure and for said diffusing of said air flow, said diffuser comprising a plurality of diffusing fins, said diffusing fins configured to be interposed between each disk of said disk pack;

an extender portion integrated in said structure and extending distal from said structure and in a direction opposite of said diffuser, said extender having a contour; and a completer component configured for interposition between said inner wall and said extender.

9. The hard disk drive as recited in claim 8 wherein said inner wall has a contour mated to said contour of said extender.

10. The hard disk drive as recited in claim 8 wherein said completer component further comprises a contour and another contour, wherein said contour is mated with said contour of said wall and said another contour is mated with said contour of said extension portion.

11. The hard disk drive as recited in claim 10 wherein said contour and said another contour of said completer component are extruded contours.

12. The hard disk drive as recited in claim 10 wherein said contour and said another contour of said completer component are indented contours.

13. The hard disk drive as recited in claim 10 wherein said contour of said completer component is an indented contour and wherein said another contour of said completer component is an extruded contour.

14. The hard disk drive as recited in claim 10 wherein said contour of said completer component is an extruded contour and wherein said another contour of said completer component is an indented contour.

15. A method for a spoiler in a hard disk drive, said method comprising:

providing a structure;

providing a diffuser portion integrated in said structure, said diffusing portion configured to be interposed between disks in a disk pack of said hard disk drive;

providing an extender portion, said extender portion integrated in said structure and extending distally from said diffuser portion, said extender portion comprising a contour, wherein said spoiler with said extender portion, when installed in said hard disk drive, provides a completed wall of a bypass channel of said hard disk drive, said wall having had a portion removed there from;

providing a completer component configured to be disposed between said wall and said extender portion; and providing contours to said completer component, said contours mated to said wall and to said extender portion.

16. The method as recited in claim 15 wherein said contour is mated to a contour of a wall structure of a bypass channel in said hard disk drive.

17. The method as recited in claim 15 wherein said providing contours further comprises:

providing an extruding contour for an indented wall contour and an indented extender portion contour.

18. The method as recited in claim 15 wherein said providing contours further comprises:

providing an indented contour for an extruded wall contour and an extruded extender portion contour.

* * * * *